United States Patent
Kraft

[11] Patent Number: 5,184,039
[45] Date of Patent: Feb. 2, 1993

[54] MOTOR/GEAR-TRAIN DRIVE UNIT, PARTICULARLY MOTOR-VEHICLE POWER-WINDOW DRIVE

[75] Inventor: Longin Kraft, Gerbrunn, Fed. Rep. of Germany

[73] Assignee: Siemens Aktiengesellschaft, Berlin & Munich, Fed. Rep. of Germany

[21] Appl. No.: 742,847

[22] Filed: Aug. 8, 1991

[30] Foreign Application Priority Data

Aug. 23, 1990 [EP] European Pat. Off. ........ 90116184.4

[51] Int. Cl.⁵ ............................................. H02K 5/00
[52] U.S. Cl. ........................................ 310/89; 310/42; 310/71; 310/83; 310/90; 310/43; 310/239
[58] Field of Search ............ 310/71, 89, 45, 239, 310/50, 83, 42, 88, 90, 43, 91, 233

[56] References Cited

U.S. PATENT DOCUMENTS

| | | | |
|---|---|---|---|
| 3,441,766 | 4/1969 | Amrein | 310/239 |
| 4,369,387 | 1/1983 | Haar | 310/83 |
| 4,447,192 | 5/1984 | Tuckey | 310/90 |
| 4,572,979 | 2/1986 | Haar | 310/71 |
| 4,574,471 | 3/1986 | Dibbern, Jr. | 310/42 |
| 4,614,886 | 9/1986 | Schneider | 310/83 |
| 4,853,576 | 8/1989 | Mayumi | 310/239 |
| 4,920,289 | 4/1990 | Saito | 310/90 |
| 4,926,078 | 5/1990 | Isozumi | 310/71 |
| 5,066,878 | 11/1991 | Sekine | 310/71 |
| 5,070,269 | 12/1991 | Tamaki | 310/239 |
| 5,081,386 | 1/1992 | Iwai | 310/239 |

FOREIGN PATENT DOCUMENTS

| | | | |
|---|---|---|---|
| 1031878 | 11/1958 | Fed. Rep. of Germany . | |
| 1142942 | 1/1963 | Fed. Rep. of Germany | 310/71 |
| 2040465 | 2/1972 | Fed. Rep. of Germany | 310/71 |
| 0041812 | 3/1977 | Japan | 310/43 |
| 0130981 | 1/1929 | Switzerland | 310/43 |
| WO03095 | 3/1991 | World Int. Prop. O. | 310/90 |

Primary Examiner—R. Skudy
Attorney, Agent, or Firm—Kenyon & Kenyon

[57] ABSTRACT

A motor/gear-train drive unit, and particularly a motor-vehicle power-window drive or the like, which can be manufactured and assembled at low cost, and which comprises a motor frame (1) enclosed in the circumferential direction and an adjacent gear case (2) at one of its axial ends and a closing bearing cap (3) at its other axial end, can be obtained by making the bearing cap (3) with a brush support plate (5) mounted therein and bonded therewith. Plug pins (41, 42) extend outwardly through the bearing cap (3). The preassembled subassembly that is axially displaceable, tightly sealed (seal ring [7]), relative to the motor frame (1) and can be secured in a given final operating position to the motor frame (1).

16 Claims, 1 Drawing Sheet

– 1 –

MOTOR/GEAR-TRAIN DRIVE UNIT, PARTICULARLY MOTOR-VEHICLE POWER-WINDOW DRIVE

BACKGROUND OF THE INVENTION

The present invention relates to a motor/gear-train drive unit, and particularly to a motor-vehicle power-window drive having a motor frame of a commutator motor, enclosed in a circumferential direction, with a gear case adjacent thereto at one of its axial ends and a closing bearing cap at its other end.

U.S. Pat. No. 3,463,951 discloses a drive unit that relates to such a motor-vehicle power-window drive.

In the drive unit of the patent, a magnet frame is inserted in a one-piece motor/gear-train case of flat design, from the initially open bearing-cap side. The magnet frame is spaced from the motor frame and supported by a spring element in a vibration-resistant manner. The case is fastened closed with screws. The bearing cap is seated on an axial abutment at the end face. A brush support plate with box-type brush holders for the commutator motor, intended as drive, is mounted in the bearing cap.

An attachment plug passes through the bearing cap in an insulated and sealing manner. On its inner surface, a free-standing soldering lug is provided for connecting leads running to the brush support plate. The rotor shaft is supported at one end in a cup-shaped bearing in the bearing cap. At its other end, which extends into the gear case and accommodates a worm gear, the rotor shaft is supported in a cylindrical roller bearing in the gear case, abutting by that end axially against a mushroom-shaped tip of a setscrew. That screw can be screwed externally to a greater or lesser axial depth into the gear case.

German Patent Publication C 10 31 878 discloses an arrangement for controlling and fixing the axial play of a rotor shaft, and more particularly that of a rotary transformer or the like. The transformer has a housing, open at one end, and is provided in the closed end wall with a first bearing for one end of the shaft, and at the open end with a cover plate with a second bearing for the other end of the shaft. The axial position of the cover plate, and hence the axial play of the shaft, is adjusted by rotating a retaining ring which is screwed into the housing and which secures the cover plate while a detent fixes the position of the retaining ring relative to the housing. With the cover plate, a brush support plate located axially in front of it and engaging it by means of projections corresponding to openings in the cover plate, can be axially positioned in a screw thread to be provided in the inner surface of the motor frame as the retaining ring is rotated.

Moreover, German Patent Publication C2-36 35 987 discloses an electrical machine in which an end shield, fabricated as a sheet-metal blank, is welded to the motor frame to permit dimensional tolerances of the shaft and of the motor frame to be compensated by varying the degree to which the end shield is pushed into the motor frame.

SUMMARY OF THE INVENTION

In accordance with the present invention, the cost of manufacturing and assembling a drive unit of the type mentioned at the outset is considerably reduced, particularly when different power ratings of the motor/gear-train drive unit are considered and in view of the simplicity adjustment of the axial play in every case.

In an embodiment of the present invention, a motor/gear-train drive unit includes a motor frame and a commutator motor enclosed in the motor frame. A gear case is disposed adjacent to the motor frame. The drive unit also includes a preassembled subassembly that includes a bearing cap, a brush support plate mounted in the bearing cap and plug pins that are bonded to the brush support plate. The plug pins extend outwardly in a sealed manner through the bearing cap. The subassembly is adapted to be continuously displaceable by insertion relative to the motor frame and is adapted to be secured to the motor frame in a given final inserted operating position. A peripheral seal ring, such as an O ring, tightly seals the subassembly from the motor frame.

The subassembly can further include an axial collar associated with the bearing cap which extends parallel to an adjacent wall of the motor frame. The axial collar may have a peripheral groove in which the peripheral seal ring may be disposed.

The bearing cap may be fixed to the motor through an ultrasonically welded joint when in the final operating position. Additionally, the unit may further comprise plug pins and a plug shell. The plug shell is molded or cast onto the bearing cap and accommodates the plug pins. The inner ends of the plug pins can extend as far as the back of the brush support plate of the commutator motor which faces away from the bearing cap. The plug pins may be bonded with other connecting terminals of the brush support plate by dip soldering.

The motor/gearing case may be made of a one-piece injection-molded or cast case made of a non-magnetic material, such as plastic or aluminum. A separate magnetic motor/return path part may be injection molded or cast into or onto the motor gear train case.

The drive unit may also include means for adjusting the axial play of the subassembly with respect to the motor frame.

With the present invention, adapting a motor/gear-train unit case to different power ratings, with correspondingly different axial lengths of the rotor and of the magnetic shells disposed for excitation in the motor frame is possible. Further, locating the bearing-cap mounting unit with the brush support plate, already preassembled and bonded for electrical connection, at appropriately varying axial depths of insertion in a moisture-proof manner in the motor frame to adjust a given axial play is also possible with the present invention. At the same time, the present invention provides a design of the utmost simplicity.

BRIEF DESCRIPTION OF THE DRAWINGS

The present invention and further advantageous modifications will now be described in detail referring to an exemplary embodiment illustrated diagrammatically in the drawing.

DETAILED DESCRIPTION

Figure 1:
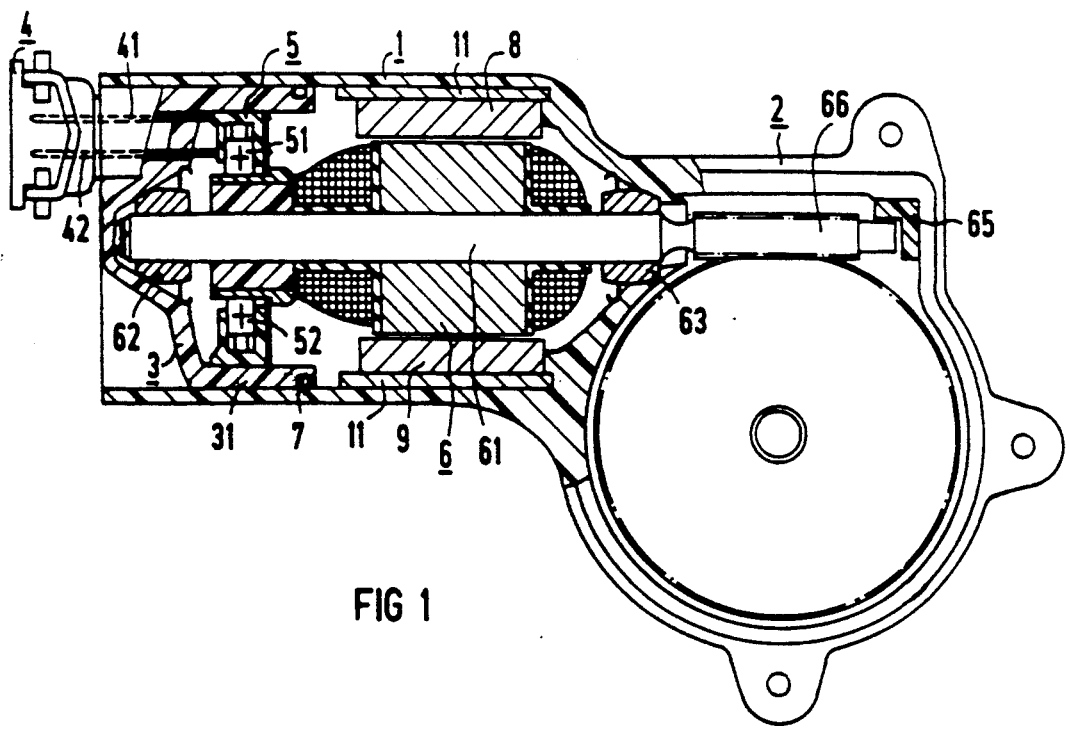
FIG. 1 is an axial longitudinal section through a motor-vehicle power-window drive.
Figure 2:
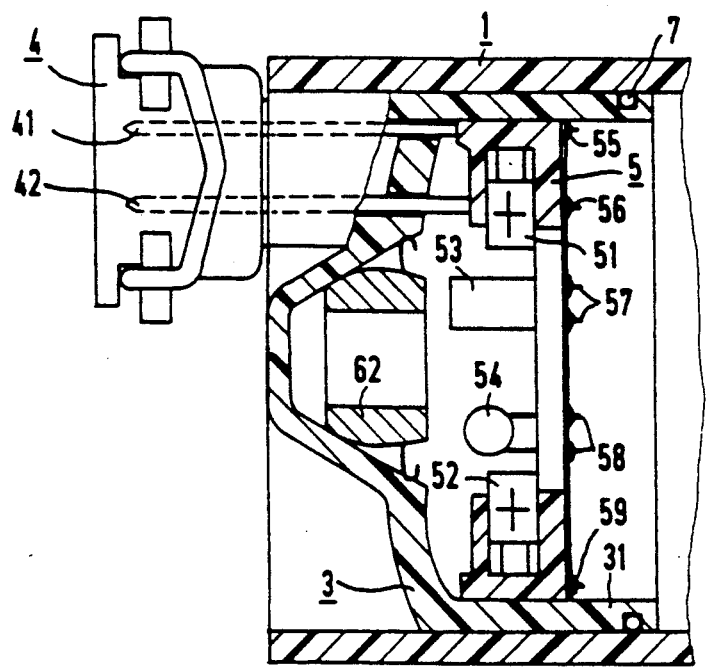
FIG. 2 shows, in an enlarged fragment from FIG. 1, the subassembly which can be preassembled, and prebonded, from the bearing cap, brush support plate and plug shell.

FIGS. 1 and 2 show a motor-vehicle power-window drive with a commutator motor in a motor frame 1 and a worm drive, driven by a commutator motor, in a gear case 2. The motor frame 1 and the gear case 2 are components of a one-piece cast plastic or aluminum case. As a magnetic return path for the magnetic shells 8 and 9 provided in the motor frame 1 for excitation, a return-path part 11 is injection-molded into the motor frame 1. The motor frame 1, is enclosed in the circumferential direction and its left-hand open end is closed in a sealing manner by a bearing cap 3. The bearing cap 3 is guided along its outer surface and within the inner surface of the motor frame 1, to abut by an axial collar 31 axially displaceably on the inner wall of the motor frame 1 during assembly. A seal 7 in the form of an O ring inserted in a depression in the axial collar 31 is outwardly closes the bearing cap 3 in a moisture-proof manner relative to the motor frame 1.

The rotor of the commutator motor is supported by its shaft 61, and accommodates also a commutator, in cup-shaped bearings 62 and 63, of which the left-hand bearing is mounted in the bearing cap 3 and the right-hand bearing in the right-hand end of the pot-type motor frame 1. The rotor shaft 61 abuts against the bearing cap 3 by the mushroom-shaped tip of its left-hand axial end and abuts against a single-thrust bearing 65 by its right-hand end, which extends into the gear case 2 and accommodates a worm shaft 66.

Mounted in the bearing cap 3 is a brush support plate 5 on which the brushes 51 and 52 riding on the commutator are held in a guided manner. A plug shell 4 is advantageously molded or cast onto the left-hand end face of the bearing cap 3 so as to be integral therewith. Plug pins 41 and 42 are inserted in the plug shell 4 and have inner ends extend as far as the brush support 5, where they are bonded, preferably by dip soldering, over soldering areas 55 and 56, simultaneously with a thermostat 53, a capacitor 54 and brushes 51 and 52, respectively, which are held on the brush support plate 5 and bonded over soldering points 57, 58 and 59, respectively, to provide terminals for connection thereof As shown in FIG. 2, the bearing cap 3 with the brush support plate 5 mounted therein and with the plug pins 41 and 42 bonded thereto and further components, such as the cup-shaped bearing 62, the thermostat 53 and the capacitor 54, are advantageously preassembled to form a subassembly. That subassembly is inserted into the motor frame 1 as far as the intended operating position, and fixed in that final operating position by being ultrasonically welded to the motor frame 1. The final operating position is determined by the axial length of the commutator motor, which is a function of the power rating of the motor,. particularly so far as its rotor winding and its magnetic shells 8 and 9 provided for excitation are concerned, as well as by the required axial play.

Clearly the axial play can be readily adjusted by inserting the bearing cap, self-sealingly supported on the motor frame 1, to a greater or lesser extent, depending on the cumulative tolerances resulting in a given case during assembly. Further accessibility from the exterior, and hence additional sealing of the motor/gear-train drive unit is not needed.

What is claimed is:

1. A motor/gear-train drive unit, comprising:
a motor frame having an inner surface;
a commutator motor enclosed in said motor frame;
a gear case disposed adjacent to said motor frame; and
a preassembled subassembly including:
a bearing cap;
a brush support plate mounted in said bearing cap; and
plug pins bonded to said brush support plate and extending outwardly, in a sealed manner, through said bearing cap;
said subassembly having an outer surface which conforms to said inner surface of said motor frame so as to be continuously displaceable, by insertion, relative to said motor frame and able to be secured to the motor frame in a final operating position; and
a peripheral seal ring tightly sealing said subassembly from said motor frame.

2. The motor/gear-train drive unit of claim 1, wherein said subassembly further includes an axial collar associated with said bearing cap and extending parallel to an adjacent wall of said motor frame, said axial collar having a peripheral groove, said seal ring being disposed in said peripheral groove.

3. The motor/gear-train unit of claim 1, wherein said bearing cap is fixed to the motor frame through an ultrasonically welded joint when in the final operating position.

4. The motor/gear-train drive unit of claim 2, wherein said bearing cap is fixed to the motor frame through an ultrasonically welded joint when in the final operating position.

5. The motor/gear-train drive unit of claim 1, further comprising a plug shell molded onto said bearing cap and accommodating said plug pins which extend in a sealed manner through said bearing cap.

6. The motor/gear-train drive unit of claim 2, further comprising a plug shell molded onto said bearing cap and accommodating said plug pins which extend in a sealed manner through said bearing cap.

7. The motor/gear-train drive unit of claim 3, further comprising a plug shell molded onto said bearing cap and accommodating said plug pins which extend in a sealed manner through said bearing cap.

8. The motor/gear-train drive unit of claim 4, further comprising a plug shell molded onto said bearing cap and accommodating said plug pins which extend in a sealed manner through said bearing cap.

9. The motor/gear-train drive unit of claim 5, wherein inner ends of the plug pins extend as far as the back of said brush support plate of the commutator motor which faces away from said bearing cap and are bonded thereto by dip soldering.

10. The motor/gear-train drive unit of claim 1, wherein said motor frame and gear case comprise a one-piece injection-molded case made of a nonmagnetic material and a separate magnetic return path part which is injection-molded into the motor frame.

11. The motor/gear-train drive unit of claim 1, further comprising means for axial play adjustment, said means including said bearing cap which is axially displaceable relative to said motor-frame.

12. The motor/gear-train drive unit of claim 1, further comprising a plug shell cast onto said bearing cap and accommodating said plug pins which extend in a sealed manner through said bearing cap.

13. The motor/gear-train drive unit of claim 2, further comprising a plug shell cast onto said bearing cap and accommodating said plug pins which extend in a sealed manner through said bearing cap.

14. The motor/gear-train drive unit of claim 3, further comprising a plug shell cast onto said bearing cap and accommodating said plug pins which extend in a sealed manner through said bearing cap.

15. The motor/gear-train drive unit of claim 4, further comprising a plug shell cast onto said bearing cap and accommodating said plug pins which extend in a sealed manner through said bearing cap.

16. The motor/gear-train drive unit of claim 1, wherein said motor frame and gear comprise a one-piece cast case made of a nonmagnetic material and a separate magnetic motor/return path part which is cast into the motor frame.

* * * * *